United States Patent [19]

Flatau et al.

[11] 3,995,096

[45] Nov. 30, 1976

[54] PROCESS FOR PREVENTING ENCRUSTATIONS DURING THE MANUFACTURE OF POLYMERS AND COPOLYMERS OF VINYL CHLORIDE BY SUSPENSIONS POLYMERIZATION

[75] Inventors: Karsten Flatau, Marl; Lothar Hinz, Hamm uber Marl; Bernd Terwiesch, Marl, all of Germany

[73] Assignee: Chemische Werke Huls Aktiengesellschaft, Marl, Germany

[22] Filed: July 30, 1975

[21] Appl. No.: 600,376

[30] Foreign Application Priority Data

Aug. 1, 1974 Germany............................ 2437044

[52] U.S. Cl. ................................................. 526/74
[51] Int. Cl.² ........................ C08F 2/18; C08F 14/06
[58] Field of Search............ 260/92.8 W, 87.7, 87.1, 260/78.5 CL, 87.5 R, 86.3, 87.5 C, 85.5 XA, 82.1; 526/74

[56] References Cited

UNITED STATES PATENTS

| | | | |
|---|---|---|---|
| 3,663,482 | 5/1972 | Gammon........................ | 260/92.8 W |
| 3,879,363 | 4/1975 | Gammon et al. ............. | 260/92.8 W |

*Primary Examiner*—Alan Holler
*Attorney, Agent, or Firm*—Millen, Raptes & White

[57] ABSTRACT

Encrustations on reactor walls and associated equipment employed in the aqueous suspension polymerization of vinyl chloride and mixtures thereof with other monomers at 30°–70° C. are prevented by employing in the polymerization charge 0.0005 – 0.05% by weight of hydrogen peroxide, calculated on the monomer or monomers, preferably at a pH of at least 7.5, e.g., 7.5 – 8.5 when using a suspending agent which is sensitive to hydrolysis.

10 Claims, No Drawings

PROCESS FOR PREVENTING ENCRUSTATIONS DURING THE MANUFACTURE OF POLYMERS AND COPOLYMERS OF VINYL CHLORIDE BY SUSPENSIONS POLYMERIZATION

BACKGROUND OF THE INVENTION

This invention relates to an improved process for the production of vinyl chloride homo- and copolymers by suspension polymerization of vinyl chloride or copolymers of vinyl chloride and copolymerizable monomers which prevents to a great extent the formation of polymer encrustations on the inner reactor wall and on associated equipment.

In conventional processes for the production of vinyl chloride polymers by suspension polymerization in an aqueous medium, polymer encrustations are formed on the inner reactor wall as well as on the associated equipment during the course of the polymerization. The polymer yield is thereby reduced and the quality of the product is impaired due to intermixing with detached wall encrustations. These coatings also impede the removal of the heat of polymerization and accordingly have a deleterious effect on the space-time yield of the reactor.

Additionally, frequent cleaning of the reactors is necessary. For cleaning purposes, automated high-pressure water jet appliances are employed. However, such devices only remove the less tightly adhering wall deposits. For this reason, the reactor must be entered after a few batches and must be cleaned be hand with the aid of a scraper. This requires extensive safety measures and, in case of very large reactors, also the installation of scaffolding.

The above-described cleaning steps entail great expenses and frequent and long idle periods, whereby the economics of the process are severely impaired. Moreover, damage to the equipment surfaces can hardly be avoided during the manual cleaning with a scraper.

Numerous measures have become known for preventing the formation of polymer encrustations during the suspension polymerization of vinyl chloride. The prior art includes process-technological methods, such as a. regulating the jacket temperature to the internal temperature of the reactor (German Unexamined Laid-Open Application DOS No. 1,520,609 corresponding to British Pat. No. 1,053,572);

b. low temperature cooling of the reactor walls (DOS No. 2,033,780);

c. exposing the interface area to a spray (DOS No. 2,224,144).

These proposed solutions, however, are not completely satisfactory since they require substantial technical expenditure. Also, the step of subjecting the walls to low-temperature cooling can be utilized only in the case of very large reactors.

It is also known to prepare the reactor wall with polar organic compounds, organic dyes and/or inorganic pigments, as well as to supplement the batch by additions of such compounds (DOS No. 2,044,259). However, such linings must be renewed after a few runs. Moreover, The substances washed off the wall and/or added to the charge deleteriously affect the quality of the polymerized product.

It has also been known to reduce the formation of encrustations by adding special agents to the polymerization charge or by using special polymerization recipes. These measures, however, lead only to partial success and furthermore are limited to specific polymerization formulae.

Thus, DOS No. 2,208,796 and DOS No. 1,946,474 (corresponding to U.S. Pat. No. 3,562,238). describe the addition of compounds having a basic reaction to the polymerization charge. As demonstrated in the examples set forth below (Table 1), this provides only a minor improvement, however.

The addition of nitrites in connection with the use of unbranched alkyl peroxydicarbonates as a measure to prevent wall deposits is described in DOS No. 2,225,236 (corresponding to U.S. Pat. No. 3,817,959). However, such additives lead to an increase in the operating time and moreover are not effective in all formulae, as demonstrated by the examples (cf. Table 1).

Several German applications disclose the addition of oxidizing agents, but in all cases merely as a supplement to another measure. Thus, DOS No. 2,044,259 (Claim 4) describes the addition of a permanganate, a dichromate and/or cerium(IV) sulfate. DOS No. 2,224,144 discloses (Claim 6) the addition of permanganic acid or the salts thereof, chromic acid, dichromic acid or the salts thereof, nitric acid, dinitrogen monoxide, dinitrogen tetroxide, dinitrogen trioxide, copper nitrate, lead nitrate, silver nitrate, ammonium nitrate, cerium oxide, copper oxide or lead oxide, in concentrations of at most 0.0001% by weight (Claim 8). These additives, taken by themselves, i.e., without any other supplemental measures, do not yield the intended success, as shown in the comparative examples (Table 1). The steps known from the prior art for preventing wall deposits during the suspension polymerization of vinyl chloride thus are unsatisfactory. They are either of little effectiveness or are connected with excessive costs. Furthermore, they have only limited applicability. Besides, part of the measures results in undesired residues of dyes and/or heavy metal compounds remaining in the polymer.

Accordingly, it is an object of the invention to provide an improved method for inhibiting the formation of encrustations during such polymerizations. Other objects will be apparent to those skilled in the art.

SUMMARY OF THE INVENTION

The above-described disadvantages of the prior art processes for the prevention of encrustations during the manufacture of polymers and copolymers of vinyl chloride by the polymerization of vinyl chloride or mixtures of vinyl chloride and copolymerizable monomers in an aqueous suspension at 30°–70° C. in the presence of suspension agents and monomer-soluble catalysts are avoided in the process of this invention, wherein a polymerization charge is employed containing 0.0005 – 0.05% by weight of hydrogen peroxide, based on the monomer.

DETAILED DISCUSSION

Preferably, the polymerization charge contains 0.001 – 0.01% by weight of hydrogen peroxide, based on the monomer.

Conventionally, a weakly acidic medium is present at the beginning of the polymerization when polymerizing without the addition of a basic agent, due to the characteristics of the introduced substances, and the acidic character of this medium usually is further increased during the course of the polymerization, due to the splitting off of small amounts of HCl. In a preferred embodiment of this invention, the process is carried out at a pH of at least 7.5. In an especially preferred embodiment of this invention, an alkaline pH is achieved with calcium hydroxide.

When the polymerization is conducted in the presence of a suspension agent which is not sensitive to hydrolysis, the selected pH of at least 7.5 is not critical. However, in a preferred embodiment of the process, a suspending agent which is not sensitive to hydrolysis is employed and during the entire polymerization the pH of the polymerization is maintained at from 8.0 to 12.5.

When the polymerization is conducted in the presence of a hydrolysis-sensitive suspension agent a pH of at most 8.5, i.e., a pH of 7.5 – 8.5, should be employed.

The effect of ammonia is adverse in the process of this invention. Therefore, the polymerization should be conducted in the absence of ammonia.

It is especially advantageous to operate with a ratio of gram equivalents of the basic agent employed to achieve the selected pH to gram equivalents of hydrogen peroxide of 1 : 0.05 to 1 : 0.25.

It is most surprising the process of this invention prevents encrustations because DOS No. 2,248,607 teaches that the suspension polymerization of vinyl chloride must be carried out in the presence of water-soluble reducing agents to prevent wall deposits. Also, the beneficial effect of the basic medium could not be foreseen. Although the older applications DOS No. 1,946,474 and DOS No. 2,208,796 teach the addition of basic-reacting compounds, the later applications DOS No. 2,225,236 (page 5) and DOS No. 2,212,962 (claim), and U.S. Pat. No. 3,757,001 recommend an acidic pH to solve the same problem.

The beneficial effect of the calcium hydroxide is even more surprising inasmuch as DOS No. 1,946,474 reports an increase in wall deposits when using this compound (cf., page 6, lines 10 et seq.).

The process of this invention can be employed in the production of vinyl chloride homo- or copolymers by the polymerization of vinyl chloride and mixtures of vinyl chloride and up to 30% by weight of the mixture of copolymerizable monomers.

Suitable comonomers are primarily monoolefinic unsaturated compounds, such as, for example, vinylidene chloride or vinyl esters of straight-chain or branched carboxylic acids of 2–20, preferably 2–4 carbon atoms, such as, for example, vinyl acetate, vinyl propionate, vinyl butyrate; unsaturated acids, such as, for example, maleic, fumaric, itaconic, crotonic, acrylic, methacrylic acid, as well as the mono- or diesters thereof with mono- or dialcohols of 1–10 carbon atoms; $\alpha$-olefins, such as, for example, ethylene, propylene, isobutylene, styrene; acrylonitrile; and polyunsaturated compounds, e.g., butadiene.

The polymerization is customarily conducted in a stirrer-equipped pressure autoclave at temperatures of 30°–70° C., perferably 40°–60° C. In general, the process is carried out under the internal pressure produced by the monomer at the selected temperature. The autoclaves are customarily equipped with agitators and baffles and are optionally connected to a reflux condenser.

The polymerization is conducted in an aqueous suspension. The ratio of monomer : water is 1:1 to 1:3, preferably 1.3:1 to 1:2. During the course of the polymerization, monomer as well as water can be replenished in metered amounts in correspondence with the volume contraction of the polymerization mixture.

Examples of monomer-soluble catalysts which can be employed are organic peroxides, e.g., diacetyl, acetylbenzoyl, dibenzoyl, dilauroyl and 2,4-dichlorobenzoyl peroxide; peresters, such as tert.-propyl peracetate, tert.-butyl peracetate, tert.-butyl peroctoate, tert.-butyl perneodecanoate, tert.-butyl perpivalate; dialkyl peroxydicarbonates, such as diisopropyl, diethylhexyl, dicyclohexyl, diethylcyclohexyl, dicetyl, di-tert.-butylcyclohexyl peroxydicarbonate; azo compounds, such as azodiisobutyric acid dinitrile [azobisisobutyronitrile], azobisdimethylvalerodinitrile; and finally mixed anhydrides of organic sulfoperacids, and carboxylic acids, such as, for example, acetylcyclohexylsulfonyl peroxide.

In a basic medium, the use of mixed anhydrides of organic sulfoperacids and carboxylic acids as catalysts should be avoided, since the polymerization is excessively slowed down and/or the operating time is unduly increased by hydrolytic splitting of these compounds.

The catalysts can be used individually or in a mixture and usually in amounts of 0.01 – 1% by weight, preferably 0.01 – 0.3% by weight, based on the monomer.

Suspension agents which are not sensitive to hydrolysis in a basic medium are, for example, cellulose derivatives, such as cellulose ethers and mixed ethers, e.g., methyl-, hydroxyethyl-, hydroxypropyl-, methylhydroxypropyl-, carboxymethyl- cellulose; styrene - maleic anhydride copolymers, polyacrylic acid derivatives, polyvinylpyrrolidone, and gelatin.

Examples of suspension agents sensitive to hydrolysis in a basic medium are polyvinyl alcohols and partially saponified polyvinyl acetates.

The suspension agents can be used either alone or in a mixture with one another. They are frequently combined with emulsifiers (auxiliary suspension agents). For this purpose, anionic as well as cationic or amphoteric and also nonionic emulsifiers can be employed.

When employing suspension agents sensitive to hydrolysis in a basic medium, a pH of 7.5 – 8.5 must be maintained. For this purpose, basic-reacting buffer substances can be added to the polymerization charge, e.g., $NaHCO_3$, $NH_4HCO_3$, $Ca(HCO_3)_2$ or $Na_2HPO_4$ individually or in mixtures in amounts of 0.005 – 0.5% by weight, based on the monomer.

When working with suspension agents not sensitive to hydrolysis, even in a basic medium, it is not absolutely necessary to exert careful control of the pH. The pH values ordinarily obtained in a conventional aqueous suspension polymerization can be tolerated. However, far better effects are attained when operating in a basic medium.

Bases suitable as additives to obtain a basic medium are basic metal oxides and hydroxides, including alkali hydroxides and oxides, e.g., sodium hydroxide, potassium hydroxide, lithium hydroxide and sodium oxide; alkaline earth hydroxides and oxides, e.g., calcium hydroxide, barium hydroxide, magnesium hydroxide and calcium oxide; and hydroxides of polyvalent metals, e.g., aluminum hydroxide. Ammonia is not suitable as an alkaline agent for achieving the effects of the present invention and the polymerization is conducted in the absence of ammonium hydroxide.

The bases are employed in amounts of 0.005 – 0.5% by weight, preferably 0.01 – 0.1% by weight, based on the monomer. In this procedure, pH values of 8 – 12.5 and preferably 10 – 12 are attained.

The use of Ca(OH)$_2$ as a base is advantageous as a special embodiment insofar as, in the thus-obtained final products, the specific electrical resistance is varied only slightly, even in case of additions of 0.1%, based on the monomer, whereas the addition of other bases generally leads to products having reduced specific electrical resistance.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

EXAMPLES 1 – 22

A 40-liter stainless steel autoclave provided with an impeller agitator was charged with 16 kg. of deionized water, 10 kg. of vinyl chloride, 10 g. of methylhydroxypropylcellulose, 5 g. of hydroxypropylcellulose, 3 g. of sorbitan monolaurate, 12 g. of dilauroyl peroxide, and 5 g. of dicetyl peroxydicarbonate. After heating to 55° C., the polymerization was conducted at an agitator speed of 200 r.p.m. within 6 hours to a conversion of 90%. Subsequently, three further batches were polymerized without cleaning the autoclave. After the fourth polymerization cycle, the wall deposits were removed from the autoclave, dried and weighed. A differentiation was made between deposits coming from the wall and those removed from the agitator. The same experiment was conducted with the additives as listed in Table 1, below.

in the agitator deposits, while the wall encrustations remain unaffected. Furthermore, this is achieved at the cost of a reduction in polymerization velocity. Adding a dichromate (DOS No. 2,044,259, claim 4) yields a satisfactory effect at a concentration of 1/100%, but the polymer has a strongly yellow color. Accordingly, the method is technically impractical. The effect of K$_2$S$_2$O$_8$, which is closely related to hydrogen peroxide in also being an oxidizing agent, shows no marked results, and these results are even more reduced in an alkaline medium.

The addition of H$_2$O$_2$ yields, in a completely surprising manner, an excellent reduction of the encrustations on wall and agitator in the ranges of 1 thousandth to 1 hundredth percent (Examples 14, 15 and 17–22). Even outside of the 0.0005 – 0.05% range recited in the claims, viz., 1 tenth and 1 ten thousandth of a percent of H$_2$O$_2$, respectively, there is still a noticable beneficial effect (Examples 13 and 16).

When operating according to the invention in the presence of H$_2$O$_2$ and simultaneously in a basic medium, the problem of wall and agitator encrustations for all practical purposes, is eliminated.

Example 24 demonstrates convincingly the advantageous results of using hydrogen peroxide in combination with a basic medium. This example illustrates the beneficial effect of the additives not only after 4 batches, as in Table 1, but also after a total of 100 batches. As can be seen, there are no encrustations whatever on the wall or on the agitator element, even after 100 batches. Example 23 is a comparative example.

TABLE 1

| Example No. | Additive 1 Type | Additive 1 % | Additive 2 Type | Additive 2 % | pH Value Start | pH Value End | Grams of Deposits Agitator | Grams of Deposits Wall | Remarks |
|---|---|---|---|---|---|---|---|---|---|
| 1 | — | — | — | — | 6.0 | 4.0 | 242 | 6 | For Comparison |
| 2 | NaOH | 0.1 | — | — | 12.0 | 12.0 | 38 | 9 | For Comparison |
| 3 | Ca(OH)$_2$ | 0.1 | — | — | 12.3 | 12.1 | 76 | 9 | For Comparison |
| 4 | Mg(OH)$_2$ | 0.1 | — | — | 10.2 | 9.7 | 16 | 4 | For Comparison |
| 5 | NH$_4$HCO$_3$ | 0.1 | — | — | 8.1 | 8.0 | 2 | 5 | For Comparison |
| 6 | — | — | NaNO$_2$ | 0.0005 | 5.6 | 3.1 | 73 | 6 | For Comparison Operating Time Doubled |
| 7 | — | — | NaNO$_2$ | 0.005 | 5.8 | 3.3 | 97 | 17 | For Comparison Operating Time Doubled |
| 8 | — | — | K$_2$Cr$_2$O$_7$ | 0.001 | 5.8 | 4.3 | 138 | 3 | For Comparison Charge is Yellow |
| 9 | — | — | K$_2$Cr$_2$O$_7$ | 0.01 | 6.8 | 3.6 | 3 | 1 | For Comparison Charge is Strongly Yellow |
| 10 | — | — | K$_2$S$_2$O$_8$ | 0.01 | 5.9 | 3.4 | 150 | 5 | For Comparison |
| 11 | Ca(OH)$_2$ | 0.1 | K$_2$Cr$_2$O$_7$ | 0.001 | 12.7 | 12.1 | 280 | 7 | For Comparison |
| 12 | Ca(OH)$_2$ | 0.1 | K$_2$S$_2$O$_8$ | 0.01 | 12.3 | 12.1 | 195 | 7 | For Comparison |
| 13 | — | — | H$_2$O$_2$ | 0.0001 | 5.5 | 3.2 | 21 | 5 | For Comparison |
| 14 | — | — | H$_2$O$_2$ | 0.001 | 5.8 | 4.0 | 10 | 3 | According to Invention |
| 15 | — | — | H$_2$O$_2$ | 0.01 | 6.2 | 4.1 | 16 | 1 | According to Invention |
| 16 | — | — | H$_2$O$_2$ | 0.1 | 6.5 | 3.6 | 58 | 3 | For Comparison |
| 17 | NaOH | 0.1 | H$_2$O$_2$ | 0.01 | 12.0 | 11.9 | 0 | 0 | According to Invention |
| 18 | Ca(OH)$_2$ | 0.1 | H$_2$O$_2$ | 0.01 | 11.9 | 11.8 | 0 | 0 | According to Invention |
| 19 | Mg(OH)$_2$ | 0.1 | H$_2$O$_2$ | 0.01 | 9.8 | 9.8 | 0 | 0 | According to Invention |
| 20 | NH$_4$HCO$_3$ | 0.1 | H$_2$O$_2$ | 0.01 | 8.7 | 8.6 | 0 | 0 | According to Invention |
| 21 | NaOH | 0.01 | H$_2$O$_2$ | 0.01 | 11.0 | 9.9 | Traces | Traces | According to Invention |
| 22 | NaOH | 0.001 | H$_2$O$_2$ | 0.01 | 9.9 | 3.8 | 4 | 1 | According to Invention |

As can be seen from the data of Table 1, the addition of basic compounds (according to DOS No. 2,208,796) produces improvements within certain pH ranges in comparison to the blank experiment. The addition of NaNO$_2$ (DOS No. 2,225,236) leads only to a reduction

EXAMPLE 23

(Comparative Example)

A stainless steel autoclave having a capacity of 6 m³ and equipped with an impeller agitator and baffle was charged with 3,300 kg. of desalted water, 2,450 kg. of vinyl chloride, 2.45 kg. of methylhydroxypropylcellulose, 0.98 kg. of hydroxypropylcellulose, 0.98 kg. of sorbitan monolaurate, 1.52 kg. of dilauroyl peroxide, and 0.91 kg. of dicetyl peroxydicarbonate. After heating to 58° C., the polymerization was conducted at an agitator speed of 100 r.p.m.. Within 7 hours, a conversion of 86% was achieved. After emptying the reactor, a thin encrustation of polymer could be seen on the wall and on the installations, which could be removed only partially by spraying the reactor inside with pressurized water. After a total of 6 batches, the wall deposits had reached an extent requiring manual cleaning with a scraper.

EXAMPLE 24

(According to the Invention)

The procedure of Example 23 was followed, except that 24.5 g. of $H_2O_2$ (calculated 100%) and 245 g. of $Ca(OH)_2$ were added to the charge. After polymerization and emptying of the reactor, all reactor surfaces had a metallic luster. Subsequently to the first batch, further charges were polymerized in the same way. After a total of 100 batches, the surfaces in contact with the liquid still exhibited a metallic gloss. A coating had formed only in the zone of the gas phase, which required removal by manual cleaning with a scraper.

EXAMPLE 25

(Comparative Example)

The procedure of Example 1 was followed, except there were added as suspension agents 35 g. of polyvinyl alcohol (saponification number 240, viscosity of a 4% aqueous solution at 20° C. 25 cp.) and 35 g. of dilauryl citrate, as well as 10 g. of lauryl alcohol. The deposits after 4 batches were 226 g. on the agitator and 60 g. on the wall.

EXAMPLES 26 – 28

Example 25 was carried out, except that the additives were introduced as set forth in Table 2. The results can be seen from Table 2.

EXAMPLE 29

Example 1 was followed, but in place of 5 g. of dicetyl peroxydicarbonate, 1.3 g. of acetylcyclohexylsulfonyl peroxide was utilized. The results are listed in Table 2.

EXAMPLE 30

The procedure of Example 29 was followed, except hydrogen peroxide was added to the charge in an amount of 0.01% by weight, based on the monomer. The results can be found in Table 2.

TABLE 2

| Example No. | Additives Type | % by Wt. | pH Value of Aqueous Phase Start | End | Grams of Wall Deposits After Four Batches On Agitator | On Wall | Remarks |
|---|---|---|---|---|---|---|---|
| 25 | — | — | 5.4 | 3.2 | 226 | 60 | For Comparison |
| 26 | $H_2O_2$ | 0.01 | 5.4 | 3.3 | 216 | 70 | For Comparison |
| 27 | $H_2O_2$ | 0.01 | 12.1 | 11.6 | About 50% of Polymer Present as Incrustations | | For Comparison |
| 28 | $Ca(OH)_2$ $H_2O_2$ | 0.1 0.01 | 8.0 | 8.0 | 10 | 0 | According to Invention |
| 29 | $(NH_4)HCO_3$ — | 0.1 — | 5.8 | 3.6 | 126 | 65 | For Comparison |
| 30 | $H_2O_2$ | 0.01 | 6.0 | 3.5 | 12 | 1 | According to Invention |

It can be seen from Table 2 that it is possible, using polyvinyl alcohol as suspension agent, which is sensitive to hydrolysis in a basic medium, to avoid wall encrustations entirely and deposits on the agitator most extensively using, according to this invention, $H_2O_2$ and maintaining a pH of 8.

Compared to percarbonates, acetylcyclohexylsulfonyl peroxide as a catalyst has the effect of causing far greater encrustations. However, such encrustations are almost entirely avoided by the process of this invention.

The advantage of using $Ca(OH)_2$ as a base will be explained hereinbelow.

When polymerizing in an alkaline medium, products are generally obtained having impaired electrical values. As demonstrated by evaluating experiments, however, changes in the electrical values are extensively avoided when using $Ca(OH)_2$ as the basic medium.

The effect of $Ca(OH)_2$ on the specific electric resistance (measured on a pressed panel of 100 × 100 × 1 mm. after storing for 24 hours at 23° C. and under 50% relative atmospheric humidity) is as follows:

| | | | |
|---|---|---|---|
| Without additive | 85 | $10^{13} \Omega \cdot cm.$ | (Products obtained |
| 0.1% $Ca(OH)_2$ | 83 | $10^{13} \Omega \cdot cm.$ | from reactor of |
| 0.01% $Na(OH)$ | 57 | $10^{13} \Omega \cdot cm.$ | 6 m³ capacity.) |
| Without additive | 65 | $10^{13} \Omega \cdot cm.$ | (Products obtained |
| 0.1% $Ca(OH)_2$ | 59 | $10^{13} \Omega \cdot cm.$ | from reactor of 40 l. |
| 0.1% $Na(OH)$ | 45 | $10^{13} \Omega \cdot cm.$ | capacity.) |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the prevention of encrustations on the surfaces of equipment contacted with the polymerization charge in the manufacture of polymers and copolymers of vinyl chloride wherein vinyl chloride or mixtures of vinyl chloride and copolymerizable monomers are polymerized in an aqueous suspension at 30°–70° C. in the presence of a suspension agent and a monomersoluble catalyst, which comprises employing a polymerization charge containing 0.0005 – 0.05% by weight of hydrogen peroxide, based on the monomer and, when the suspending agent is sensitive to hydrolysis, conducting the polymerization throughout at a pH of 7.5 – 8.5.

2. A process according to claim 1 wherein the polymerization charge contains 0.001 – 0.01% by weight of hydrogen peroxide, based on the monomer.

3. A process according to claim 1 wherein the polymerization is conducted in the presence of a base at a pH of at least 7.5.

4. A process according to claim 3 wherein the base is calcium hydroxide.

5. A process according to claim 3 wherein the ratio of gram equivalents of the base to gram equivalents of hydrogen peroxide is 1 : 0.05 to 1 : 0.25.

6. A process according to claim 3 wherein the suspending agent is insensitive to hydrolysis and the pH of the polymerization mixture is maintained at 8.0 – 12.5 during the entire polymerization.

7. A process according to claim 6 wherein the base is calcium hydroxide.

8. A process according to claim 7 wherein the polymerization charge contains 0.001 – 0.01% by weight of hydrogen peroxide, based on the monomer.

9. A process according to claim 3 wherein the polymerization is conducted in the presence of a hydrolysis-sensitive suspension agent and the pH of the polymerization is maintained at 7.5 – 8.5.

10. A process according to claim 9 wherein the base is calcium hydroxide and wherein the polymerization charge contains 0.001 – 0.01% by weight of hydrogen peroxide, based on the monomer.

* * * * *